(12) United States Patent
Farachi et al.

(10) Patent No.: US 6,562,939 B1
(45) Date of Patent: May 13, 2003

(54) SIMPLIFIED METHOD OF PRODUCING BIODEGRADABLE ALIPHATIC POLYESTERS

(75) Inventors: Fernanda Farachi, San Pietro Vernotico (IT); Marco Foa', Novara (IT); Tiziana Milizia, Avellino (IT)

(73) Assignee: Ministero Dell 'Universita' e Della Ricerca Scientifica e Tecnologica, Rome (IT)

( * ) Notice: Subject to any disclaimer, the term of this patent is extended or adjusted under 35 U.S.C. 154(b) by 0 days.

(21) Appl. No.: 09/936,598
(22) PCT Filed: Mar. 15, 2000
(86) PCT No.: PCT/EP00/02305
§ 371 (c)(1),
(2), (4) Date: Dec. 4, 2001
(87) PCT Pub. No.: WO00/55236
PCT Pub. Date: Sep. 21, 2000

(30) Foreign Application Priority Data

Mar. 15, 1999 (IT) .......................................... TO99A0198

(51) Int. Cl.⁷ .............................................. C08G 63/78
(52) U.S. Cl. ...................... 528/283; 528/302; 528/501
(58) Field of Search .................. 528/283, 302, 528/501; 524/783

(56) References Cited

U.S. PATENT DOCUMENTS

| 4,554,343 A | 11/1985 | Jackson, Jr. et al. |
| 4,970,288 A | 11/1990 | Larkin et al. |
| 5,166,310 A | 11/1992 | Rooney ....................... 528/176 |
| 5,306,787 A | 4/1994 | Takiyama et al. ........... 525/437 |
| 5,741,882 A | 4/1998 | Fujii et al. .................. 524/755 |
| 5,905,046 A | 5/1999 | Takeda et al. .............. 428/913 |

FOREIGN PATENT DOCUMENTS

| EP | 0 565 235 | 10/1993 |
| EP | 0 565 235 A2 | 10/1993 |
| EP | 0 618 249 A2 | 10/1994 |
| EP | 0 747 416 A1 | 12/1996 |
| EP | 0 747 416 | 12/1996 |
| WO | WO 94/14870 | 7/1994 |
| WO | 94/14870 | 7/1994 |

OTHER PUBLICATIONS

Internationl Search Report, dated Jul. 12, 2000.
Preliminary Examination Report, dated May 21, 2001.
Chemical Abstract for Japanese publication No. 0048982, published Apr. 23, 1979.
Chemical Abstract for Japanese publication No. 61019628, published Jan. 28, 1986.
Chemical Abstract for Japanese publication No. 09059359, published Mar. 4, 1997.

*Primary Examiner*—Samuel A. Acquah
(74) *Attorney, Agent, or Firm*—Bryan Cave LLP

(57) ABSTRACT

A method of synthesizing biodegradable aliphatic polyesters from one or more aliphatic dicarboxylic acids or diesters of the said acids and one or more linear or branched aliphatic glycols, comprising a first esterification or transesterification step and a second deglycolation under vacuum step, in which the catalyst is monobutylstannoic acid both for the esterification or transesterification step and for the deglycolation under vacuum step.

18 Claims, 1 Drawing Sheet

US 6,562,939 B1

SIMPLIFIED METHOD OF PRODUCING BIODEGRADABLE ALIPHATIC POLYESTERS

TECHNICAL FIELD

The present invention relates to a novel method of preparing biodegradable aliphatic polyesters which can be produced by polycondensation between aliphatic diols and aliphatic diacids or esters thereof.

BACKGROUND OF THE INVENTION

It is known that aliphatic polyesters represent a class of biodegradable polymers. The feasibility of using them to produce products, however, is linked to the achievement of high molecular weights which enable the products to have suitable qualities such as, for example, adequate mechanical strength, which render them fit for use.

In the literature, various methods of achieving this objective have been tried.

In U.S. Pat. No. 5,306,787 and in European patent application EP-0 565 235, the use of diisocyanates as chain extenders on the fused polymer is described. In patent application EP 0 747 416 the use of triisocyanates alongside diisocyanates is also reported.

The use of these chain extenders makes the polymerization process more complex since it requires two distinct steps: the actual polymerization step, and the upgrading step to produce high molecular weights. In these cases, the polymerization process is also dangerous to health and capable of unfavourably modifying the biodegradability of the materials and giving rise to potentially toxic substances during the biodegradation processes.

According to U.S. Pat. No. 5,741,882, the production of saturated polyesters of high molecular weight from diesters and glycols is linked basically with the particular way in which the catalytic system is added, and with the presence of a scavenger of free radicals. The catalyst, which is constituted by alcoholates or acetyl acetonates of various transition metals, preferably of titanium since they are indicated as being most active, is added at at least two moments in the course of the polymerization step, preferably at the beginning and during the deglycolation.

In addition to the complex and ill-defined way of adding the catalyst, the method claimed suffers from some important limitations such as the need to start with esters of the saturated acids, and the fact that at least 30% of the esters are succinates and that at least 70% of the glycols comprise 1,4-butandiol.

Limitations in structure are also present in the method described in the patent WO94/14870. The dicarboxylic acid used is in fact succinic acid or a mixture thereof with another aliphatic diacid. The method also provides for a particularly complex catalytic system comprising a catalyst for the first stage of the polymerization and a catalyst for the second stage. In fact, during the esterification or transesterification step, the use of tetrabutyl titanate, alone or also mixed with calcium or zinc acetates, tetrapropyl titanate, or dibutyl tin oxide, is provided for. During the deglycolation stage, dibutyl tin oxide is used, alone or mixed with butyl, isopropyl, or n-propyl titanates or calcium acetate.

Moreover, the polymerization in solvent described in patent application EP-0 618 249 appears not to be easy to implement in practice owing to the need to use and to dehydrate large quantities of high-boiling solvents such as diphenyl ether. There is a further difficulty when the solubility of the polymer is such as to require large quantities of precipitating solvent for the isolation.

With regard to the use of catalysts in the polyester preparation process, various classes of inorganic or organometallic tin compounds, used mainly for the production of aromatic polyesters in the polyesterification or transesterification step, have been described (U.S. Pat. Nos. 4,970,288, 5,166,310). In no case, however, is the use of these compounds described for the preparation of biodegradable aliphatic polyesters.

Moreover, amongst organometallic tin compounds, butylstannoic acid is not described as having a greater activity for the production of biodegradable aliphatic polyesters than the other tin derivatives.

DESCRIPTION OF THE INVENTION

Figure 1:
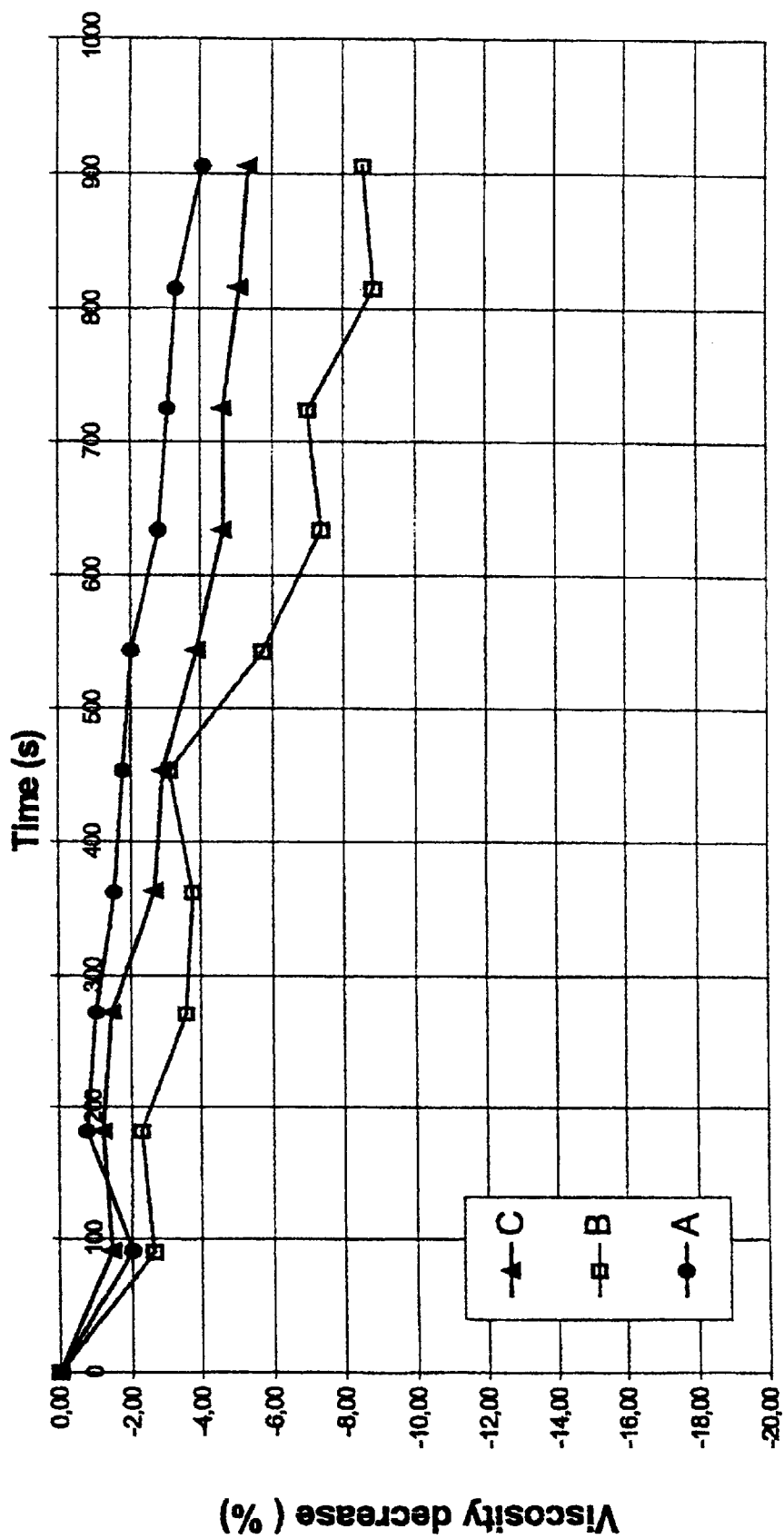
FIG. 1 is a graph illustrating the decrease in viscosity of three samples (A, B and C) over a period of time.

The subject of the present invention is a method of synthesizing biodegradable aliphatic polyesters from one or more aliphatic dicarboxylic acids (or from diesters of the said aliphatic dicarboxylic acids) and one or more linear or branched aliphatic glycols, comprising an esterification or transesterification step and a deglycolation under vacuum step, characterized in that the catalyst is monobutylstannoic acid and that the catalyst is the sole catalyst both for the esterification or transesterification step, and for the deglycolation under vacuum step.

In particular, according to the novel method, it is possible to prepare biodegradable saturated polyesters, suitably adjusting their molecular weights according to the practical applications concerned (films, injection-moulding products, extrusion coatings, fibres, etc.), by virtue of the use of a catalyst which is effective both in the esterification or transesterification step and in the deglycolation step.

The method according to the invention thus provides for a suitable range of molecular weights and overcomes the disadvantages described in the prior art.

Biodegradable polyesters made according to the method of the invention display a good thermal stability (which allows them a good processability) and a good biodegradability.

Examples of dicarboxylic acids used in the method of producing saturated aliphatic polyesters according to the invention are oxalic, malonic, succinic, glutaric, adipic, pimelic, suberic, azelaic, sebacic, undecandioic, dodecandioic, brassilic acids and dimer acids.

Examples of diols are 1,2-ethandiol, 1,4-butandiol, 1,6-hexandiol, 1,7-heptandiol, 1,8-octandiol, 1,9-nonandiol, 1,10-decandiol, 1,12-dodecandiol, 1,4-cyclohexandimethanol, 1,4-cyclohexandiol, neopentyl glycol, polyoxyalkylenes and anhydrous and di-anhydrous sorbitol.

The diol is loaded into the reaction system, preferably in quantities of from 1 to 1.5 moles per mole of diacid or diester.

The method according to the invention has been found particularly effective in the synthesis of poly(alkylene sebacates).

The synthesis of the polyester in the method according to the invention is carried out in two steps, that is:

1) the esterification or transesterification step which is preferably carried out at temperatures of between 180° C. and 230° C. and in a stream of nitrogen until distillation of the by-products (water and monovalent alcohol) is complete;

2) the deglycolation step which is preferably carried out in a dynamic vacuum at a pressure of <1 mmHg and at temperatures of between 220° C. and 250° C., for a period of between 3 and 10 h.

The monobutylstannoic acid catalyst may be added at any moment during the process before the beginning of the deglycolation step and, preferably, at the beginning of the polymerization process.

The catalyst is preferably added in quantities of between $0.5-10^{-4}$ and $5-10^{-3}$ moles of catalyst/mole of dicarboxylic acid.

The method according to the invention can advantageously also be used for the synthesis of copolymers of the above-mentioned polyesters, in particular, containing up to 10% in moles of aliphatic hydroxy-acids.

Examples of these hydroxy-acids are glycolic, hydroxybutyric, hydroxycaproic, hydroxyvaleric, 7-hydroxyheptanoic, 8-hydroxyoctanoic, 9-hydroxynonanoic, lactic, ricinoleic, and 9,10-dihydroxystearic acids.

The method according to the invention is also suitable for the synthesis of branched aliphatic polyesters which are produced by introducing trifunctional or polyfunctional comonomers into the reaction system in quantities of between 0.1 and 5% in moles, relative to the dicarboxylic acid.

Examples of these comonomers are glycerol, pentaerithritol, trimethylolpropane and citric acid.

The polyesters produced by the method according to the invention have inherent viscosities (measured with an Ubbelhode viscometer for solutions in $CHCl_3$ with a concentration of 0.2 g/dl at 25° C.) of between 0.8 and 1.5 dl/g and preferably between 0.9 and 1.3 dl/g and MFRs, measured according to the ASTM D1238 (150° C./2.16 Kg) standard, of between 0.1 g/10 kin and 70 g/10 min, and preferably between 2 g/10 min and 30 g/10 min. These values render the polyesters produced by the method according to the invention particularly suitable for many practical applications.

EXAMPLES

Some examples of the method according to the invention are now given, purely by way of non-exhaustive indication.

Example 1

A 25 l steel reactor with a mechanical stirrer, an inlet for the stream of nitrogen, a condenser, and a connection to a vacuum pump was loaded with 5050 g of sebacic acid, 2362.5 g of butandiol, and 4 g ($1.9-10^{-2}$ moles, corresponding to $7.6 \times 10^{-4}$ moles cat./moles sebacic acid) of monobutylstannoic acid catalyst.

The temperature was gradually increased to 190° C. with vigorous stirring and under a stream of nitrogen. The reaction was continued until distillation of the water had been completed (900 ml), over a period of 210 min.

The vacuum system was then switched on, producing a vacuum of 0.5 torrs, and the temperature was brought to 230° C. over a period of 30 min.

The reaction was continued for 210 min at the temperature given above and at the pressure of 0.5 torrs. The resulting polyester has then been discharged from the reactor by means of a die forming strands which have been cooled in a water bath at 15° C. for, at least, 5 seconds. The polyester has then been granulated and dried to a water content less than 0.2% by weight. With the process has been produced 6 kg of polybutylene sebacate with an inherent viscosity of 0.9 dl/g and a MFR of 40 g/10 min.

Comparative Example 1 Bis

The method described in Example 1 was repeated to produce the polybutylene sebacate polyester in the same experimental conditions but with the use of dibutyl tin oxide in a quantity of 4.5 g ($1.9-10^{-2}$ mol) as the sole catalyst.

The polymer produced had an inherent viscosity of 0.58 dl/g, that is, a much lower viscosity value which rendered it unsuitable for any significant practical application.

Example 2

6877 g of sebacic acid and 3217 g of butandiol were loaded into the reactor of Example 1. The temperature was gradually increased to 200° C. with vigorous stirring and under a stream of nitrogen. The reaction was continued until distillation of the water had been completed (1226 ml), over a period of 180 min.

4.0 g of monobutylstannoic acid catalyst (corresponding to $5.6 \times 10^{-4}$ moles cat/moles sebacic acid) was then added to the reactor and the vacuum system was switched on, producing a vacuum of 0.5 torrs, and the temperature was brought to 240° C., over a period of 50 min. The reaction was continued for 300 min and the resulting polymer has been then subjected to the discharge, cooling and drying procedure described in Example 1.

The polymer produced had an inherent viscosity of 1.32 dl/g and a MFR of 4 g/10 min.

Example 3

5056 g of sebacic acid, 3028 g of hexandiol, and 4 g of monobutylstannoic acid catalyst were loaded into the reactor of Example 1.

The temperature was gradually increased to 205° C. with vigorous stirring and under a stream of nitrogen. The reaction was continued until distillation of the water had been completed (900 ml), over a period of 180 min.

The vacuum system was then switched on, producing a vacuum of 0.5 torrs, and the temperature was brought to 240° C. over a period of 40 min. The reaction was continued for 300 min and the resulting polymer has been then subjected to the discharge, cooling and drying procedure described in Example 1.

The polymer produced had an inherent viscosity of 1.3 dl/g and a MFR of 3 g/10 min.

Example 4

6464 g of sebacic acid, 2182 g of 1-2-ethandiol and 6 g of monobutylstannoic acid catalyst were loaded into the reactor of Example 1.

The temperature was gradually increased to 190° C. with vigorous stirring and under a stream of nitrogen. The reaction was continued until distillation of the water had been completed (1150 ml), over a period of 300 min.

The vacuum system was then switched on, producing a vacuum of, 0.5 torrs, and the temperature was brought to 240° C. over a period of 30 min. The reaction was continued for 420 min and the resulting polymer has been then subjected to the discharge, cooling and drying procedure described in Example 1.

The polymer produced had an inherent viscosity of 1.24 dl/g and a MFR of 5 g/10 min.

Example 5

A 1.5 l, cylindrical, Pyrex glass reactor with a mechanical stirrer, an inlet for the stream of nitrogen, a condenser, and a connection to a vacuum pump was loaded with 118 g of succinic acid, 121 g of hexandiol and 0.26 g of monobutylstannoic acid catalyst.

The temperature was gradually increased to 210° C. with vigorous stirring and under a stream of nitrogen. The reaction was continued until distillation of the water had been completed (36 ml), over a period of 150 min.

The vacuum system was then switched on, producing a vacuum of 0.5 torrs, and the temperature was brought to 230° C. over a period of 30 min. The reaction was continued for 300 min at the temperature given above and at the pressure of 0.5 torrs, producing 200 g of polyhexamethylene succinate with an inherent viscosity of 0.8 dl/g and a MFR of 60 g/10 min.

Example 6

202 g of sebacic acid, 109 g of hexandiol, 10.4 g of neopentyl glycol, and 0.26 g of monobutylstannoic acid were loaded into the reactor described in Example 5.

The temperature was gradually increased to 180° C. with vigorous stirring and under a stream of nitrogen. The reaction was continued until distillation of the water had been completed (36 ml), over a period of 240 min.

The vacuum system was then switched on, producing a vacuum of 0.5 torrs, and the temperature was brought to 240° C. The reaction was continued for 300 min at the temperature given above and at the pressure of 0.5 torrs. The polymer produced had an inherent viscosity of 1.60 dl/g and a MFR of 12 g/10 min.

Example 7

101 g of sebacic acid, 89.2 g of decandiol, and 0.13 g of monobutylstannoic acid were loaded into the reactor described in Example 5.

The temperature was gradually increased to 190° C. with vigorous stirring and under a stream of nitrogen. The reaction was continued until distillation of the water had been completed (18 ml), over a period of 210 min.

The vacuum system was then switched on, producing a vacuum of 0.5 torrs, and the temperature was brought to 240° C. The reaction was continued for 240 min at the temperature given above and at the pressure of 0.5 torrs. The polymer produced had an inherent viscosity of 1.2 dl/g and a MFR of 5 g/10 min.

Tests on the thermal stability have been carried out on the polyester in order to evaluate its stability with respect to temperature and time.

In order to obtain data on the thermal stability of a polymeric material it is possible to measure, by a rheometer, the viscosity of the melt at constant temperature and shear rate since the viscosity of the melt is related to the molecular weight distribution of the polymer.

When the viscosity increases this means a regradation or cross-linking phenomena, whereas when the viscosity decreases it means that a degradation occurs.

With regard to the measurement of the thermal stability it has to be noted that:

the temperature has been selected in relation to the standard conditions for the polymer processing since the polymer has to result stable during the manufacturing of the final products;

residence time of the polymer in the barrel of the rheometer has been selected with regard to the maximum residence time (at the selected temperature) of the polymer in a processing device (such as an extruder and so on);

the shear rate has been selected with reference to a value corresponding to the "linear behaviour zone" of the polymer that is to say the zone of the curve stress/shear rate where a doubling of the shear corresponds to a doubling of the stress.

Tests have been performed on 3 samples:

sample A: polyester made according to example 2;

sample B: polyester made according to example 2 but with a $11.3 \times 10^{-4}$ ratio of moles cat/moles sebacic acid and a MFR of 12 g/10 min;

sample C: polyester made according to example 2 but with a $11.3 \times 10^{-4}$ ratio of moles cat/moles sebacic acid and a MFR of 4 g/10 min.

The tests have been performed on a capillary rheometer GOTTFERT RHEO-TESTER 1000 which detect the viscosity of the melt. The temperature of the chamber was 160° C.

The polymer has been fed to the barrel and preheated for a time of 650 s (pre heating time) and then has been pushed in the capillary so to have a shear rate of 100 s$^{-1}$.

Viscosity values of the melt have been detected from the end of the preheating time over a period of 900 s (that is to say a time higher than the usual residence time of the polymer in a processing device).

The viscosity decrease has been expressed as:

$$\eta i - \eta o / \eta o \times 100$$

where $\eta o$=viscosity at the end of the pre-heating time $\eta i$=viscosity after i sec from the end of the pre-heating time where 0<i<900 s The data are reported in FIG. 1. They show that after 900 sec the viscosity decrease is less than 10%.

Texts have been performed also with reference to the biodegradability of the polymers made with the process according to the invention.

Polymers produced according to example 2 (polybutylene sebacate), example 3 (polyexamethylene sebacate) and example 7 (polydecamethylene sebacate) have been subjected to the Control Composting Test according to the ISO DIS 14855.

The polymers have shown a biodegradability higher than 60% in 180 days with the polybutylene sebacate showing a biodegradability higher than 90% in the same period of time.

Polyesters produced according to the process of the invention are suitable for a lot of applications wherein a good processability and/or a good biodegradability of the polymer are requested such as coatings produced by extrusion-coating, multi-layer laminates with layers of paper, plastics material or paper/plastics material, aluminium and metallized films, films as such and multi-layer films with other polymer materials, sacks and bags for organic waste and for grass cuttings with periods of use longer than 1 week, single-layer and multi-layer food packaging comprising containers for milk, yoghurt, cheeses, meat and beverages, in which the layer in contact with the food or beverage is formed by the aliphatic polyester, composites with gelatinized or destructured starch, and/or complexed starch or natural starch as a filler, a mono-directional and bi-directional films, shrink films, stretch films, semi-expanded and expanded products produced by physical and/or chemical means, by extrusion, injection, or agglomeration of pre-expanded particles, expanded sheet and expanded containers for foods, for drugs, and for fast food, fibres, fabrics and non-woven fabrics in the hygiene, sanitary and clothing fields, composites with mineral and vegetable fillers, thermoformed sheets for the food or fast-food packaging fields, bottles for the food, cosmetics and pharmaceutical fields, fishing nets, containers for fruit and vegetables, extruded sections usable in the fast-food field and irrigation pipes in the agricultural field.

What is claimed is:

1. A method of synthesizing biodegradable aliphatic polyesters with inherent viscosities of between 0.8 to 1.5 dl/g, as measured in chloroform at 25° C. from one or more aliphatic dicarboxylic acids or diesters of said acids and one or more linear or branched aliphatic glycols, comprising a first esterification or transesterification step and a second deglycolation under vacuum step, in which the catalyst consists essentially of monobutylstannoic acid both for the esterification or transesterification step and for the deglycolation under vacuum step.

2. A method according to claim 1, in which the esterification or transesterification step is carried out at atmospheric pressure, at temperatures of between 180° C. and 230° C., and in a stream of nitrogen, until distillation of the by-product is complete.

3. A method according to claim 1, in which the catalyst is added at the beginning of the esterification or transesterification step.

4. A method according to claim 1, in which the aliphatic polyester produced is polyethylene sebacate, polybutylene sebacate, polyhexamethylene sebacate, or polydecamethylene sebacate.

5. A method according to claim 1, in which the monobutylstannoic acid catalyst is added in quantities of between $1 \times 10^{-4}$ and $2.5 \times 10^{-3}$ moles cat./mole dicarboxylic acid.

6. A method according to claim 1, in which the deglycolation step is carried out in a vacuum of <1 mm Hg and at temperatures of between 220° C. and 250° C.

7. A method according to claim 1, in which the catalyst is added before the deglycolation step.

8. A method according to claim 1, for the synthesis of poly(alkylene-sebacates).

9. A method according to claim 1, in which the aliphatic glycol is used in quantities of between 1 and 1.5 moles per mole of diacid or diester.

10. A method according to claim 1, in which the aliphatic polyester may contain up to 10% in moles of aliphatic hydroxy-acids.

11. A method according to claim 1, in which the hydroxy-acid is constituted by glycolic, hydroxybutyric, hydroxycaproic, hydroxyvaleric, 7-hydroxyheptanoic, 8-hydroxyoctanoic, 9-hydroxynonanoic, lactic, ricinoleic, or 9,10-dihydroxystearic acid.

12. A method according to claim 1, in which the aliphatic polyester may contain up to 1% in moles of trifunctional or polyfunctional comonomers.

13. A method according to claim 1, in which the monobutylstannoic acid catalyst is added in quantities of between $0.5 \times 10^{-4}$ and $5 \times 10^{-3}$ moles cat./mole dicarboxylic acid.

14. Polyesters produced by a method according to the preceding claims, with inherent viscosities of between 0.8 and 1.5 dl/g and MFRs of between 0.1 g/10 min and 70 g/10 min, measured according to ASTM D1238 (150° C., 2.16 kg) and wherein the thermal stability measured as viscosity decrease is less than 10% on a capillary rheometer at 160° C. and shear rate of 100 s$^{-1}$.

15. Polyesters according to claim 14, wherein the biodegradability in the Control Composting Test ISO DIS 14855 is higher than 60% in 180 days.

16. Polyesters according to claim 15, wherein the biodegradability is higher than 90% in 180 days.

17. Polyesters produced by a method according to claim 14 with inherent viscosities of between 0.9 and 1.3 dl/g.

18. Polyesters produced by a method according to claim 14 with MFRs of between 2 g/10 min and 3 g/10 min.

* * * * *